United States Patent [19]
Zappi et al.

[11] Patent Number: 5,922,112
[45] Date of Patent: Jul. 13, 1999

[54] APPARATUS FOR CONTROLLING FOAM

[75] Inventors: Mark E. Zappi, Mississippi State, Miss.; Brad E. Rogers, Sidney, Ohio

[73] Assignee: The United States of America as represented by the Secretary of the Army, Washington, D.C.

[21] Appl. No.: 08/929,979

[22] Filed: Sep. 15, 1997

[51] Int. Cl.$^6$ .................................................. B01D 19/04
[52] U.S. Cl. ............................... 96/176; 95/155; 95/157; 95/242
[58] Field of Search ............................... 96/176; 95/242, 95/155, 157; 210/608; 222/52, 56, 64

[56] References Cited

U.S. PATENT DOCUMENTS

| | | | |
|---|---|---|---|
| 3,031,102 | 4/1962 | Storms | 222/16 |
| 3,668,479 | 6/1972 | Weston et al. | 141/360 X |
| 4,011,927 | 3/1977 | Smith | 361/197 X |
| 4,372,665 | 2/1983 | Kaufmann | 137/624.13 X |
| 4,372,666 | 2/1983 | Kaufmann | 137/624.13 X |
| 4,609,127 | 9/1986 | Hart | 222/66 |
| 4,624,745 | 11/1986 | Sande et al. | 96/176 X |
| 4,637,525 | 1/1987 | Miura et al. | 222/22 |
| 4,676,403 | 6/1987 | Goudy, Jr. et al. | 222/54 |
| 5,271,526 | 12/1993 | Williams | 222/16 |
| 5,437,842 | 8/1995 | Jensen et al. | 96/176 X |

*Primary Examiner*—Richard L. Chiesa
*Attorney, Agent, or Firm*—Luther A Marsh

[57] ABSTRACT

A system for automatically delivering an anti-foaming agent to a biological waste treatment system includes a sensor for monitoring the amount of foam present in the system, a pump for pumping a predetermined quantity of anti-foaming agent into the system, and a controller for initiating the pumping sequence when the quantity of foam in the system reaches a preselected level. The controller includes two relays. The first relay controls the length of time the pump is on, thereby controlling the amount of anti-foam injected into the system, and the second relay establishes a period of time following the pumping period when the pump cannot be activated, thereby providing a period of time for the anti-foam to break down the foam before additional anti-foam can be added.

5 Claims, 1 Drawing Sheet

APPARATUS FOR CONTROLLING FOAM

BACKGROUND OF THE INVENTION

The present invention relates to the biotreatment of waste and, more particularly, to a method and apparatus for automatically injecting an adequate amount of anti-foaming agent into a biological waste treatment system to control the amount of foam in the system.

BRIEF DESCRIPTION OF THE PRIOR ART

Anti-foam injection apparatus currently used to add an anti-foaming agent to a wastewater treatment system add the agent when a sensor indicates that a predetermined high level of foam is present in the system and continues to add anti-foam agent until the foam is reduced to an acceptable level. However, because anti-foam agent takes some time (generally between 1 and 3 minutes) to begin breaking down the foam, the sensor monitoring the amount of foam in the system will continue to indicate a high level of foam present in the system even though an adequate amount of anti-foam agent has been added. Consequently, a significant amount of anti-foaming agent is wasted.

Various methods and devices are known in the patented prior art for automatically injecting chemical additives into a treatment system. The Hart U.S. Pat. No. 4,609,127, for example, discloses a portable dispensing device for dispensing additives into a fluid system such as a water or sewage system. The dispenser includes a reservoir, a pump, a valve, and three relays. The relays may be adjusted to control the dispensing periods and the length of time between the periods. No sensor is provided to indicate when additive should be added. In addition, a selected amount of additive is dispensed at selected intervals independent of the amount of additive needed. Accordingly, the amount of additive dispensed is not tailored to the amount needed in the system and too little or too much additive is often added.

The present invention was developed in order to overcome these and other drawbacks of the prior devices by providing an improved method and apparatus for injecting additives, such as an anti-foam agent, into a biological wastewater treatment system which accounts for the lag time required for the anti-foam agent to begin breaking down the foam. The apparatus includes a sensor which monitors the amount of foam present in the system, a pump for introducing the anti-foaming agent into the system when the amount of foam reaches a predetermined level, and a control circuit for controlling the frequency and duration of the injection interval.

SUMMARY OF THE INVENTION

Accordingly, a primary object of the present invention is to provide an improved apparatus for automatically injecting an optimal quantity of anti-foaming agent into a biological waste treatment system.

It is a more specific object of the invention to provide an injection apparatus including a sensor for monitoring the amount of foam present in a wastewater treatment reactor, a pump for pumping anti-foaming agent into the reactor for a pre-selected period of time, and an electronic relay box for initiating the pumping sequence when the quantity of foam in the reactor reaches a preselected level. The relay box includes two timing relays. The first relay controls the length of time the pump is on when a high foam signal is received from the sensor, thereby controlling the amount of anti-foam injected into the reactor, and the second relay establishes a period of time following the pumping period when the pump cannot be activated. Thus, during this second time period, even if the sensor measures a high level of foam present in the reactor, no anti-foam agent can be added to the reactor. The first relay controls the activation of the second relay by closing a contact associated therewith. The second relay controls the time delay following the pumping sequence when additional anti-foaming agent cannot be pumped by opening a contact arranged between the sensor and the first relay, thereby preventing a signal from being transmitted from the sensor to the first relay.

It is another object of the invention to provide a method for automatically injecting an optimal quantity of anti-foaming agent into a wastewater treatment system. The method includes monitoring the quantity of foam present in the system, injecting an anti-foaming agent into the system for a preselected period of time when a preselected high level of foam has been reached, and establishing a second period of time following the injection of the anti-foaming agent during which no additional anti-foaming agent can be added to the system regardless of the amount of foam present in the system.

It is a further object of the invention to provide a method for controlling the amount of foam in a wastewater treatment system in which both the time period during which the anti-foaming agent is injected and the idle period following the injection are adjustable and are repeated as needed to maintain an acceptably low level of foam in the system.

BRIEF DESCRIPTION OF THE DRAWINGS

Other objects and advantages of the invention will become apparent from a study of the following specification when viewed in light of the accompanying drawings, in which.

DETAILED DESCRIPTION

Figure 1:
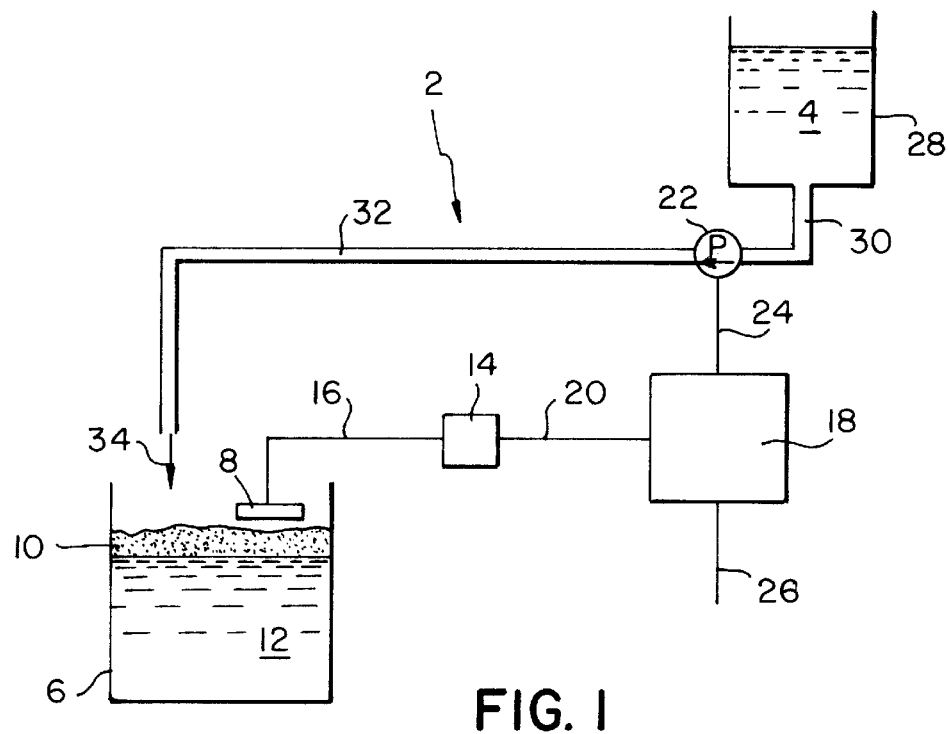
FIG. 1 is a schematic illustration of the apparatus according to the invention.

Referring first to FIG. 1, there is shown an apparatus 2 for injecting an anti-foaming agent 4 into a wastewater reservoir or reactor 6. A foam sensing element 8 is mounted horizontally above the reactor to monitor the level of foam 10 which accumulates on top of wastewater 12 being treated. Alternatively, the probe sensor may be mounted vertically. Probe sensor 8 is connected with a sensor power source 14 via cable 16 and the power source is further connected with a relay box 18 via wire 20. The relay box, in turn, is connected with a pump 22 via wire 24 and is supplied with power via power cord 26.

The input end of the pump is connected with a tank 28 which contains the anti-foam 4 agent via pipe section 30 and the output end of the pump is connected with a section of pipe 32 which extends to reactor 6, thereby allowing anti-foam indicated by arrow 34 to be dispensed into the reactor 6.

Figure 2:
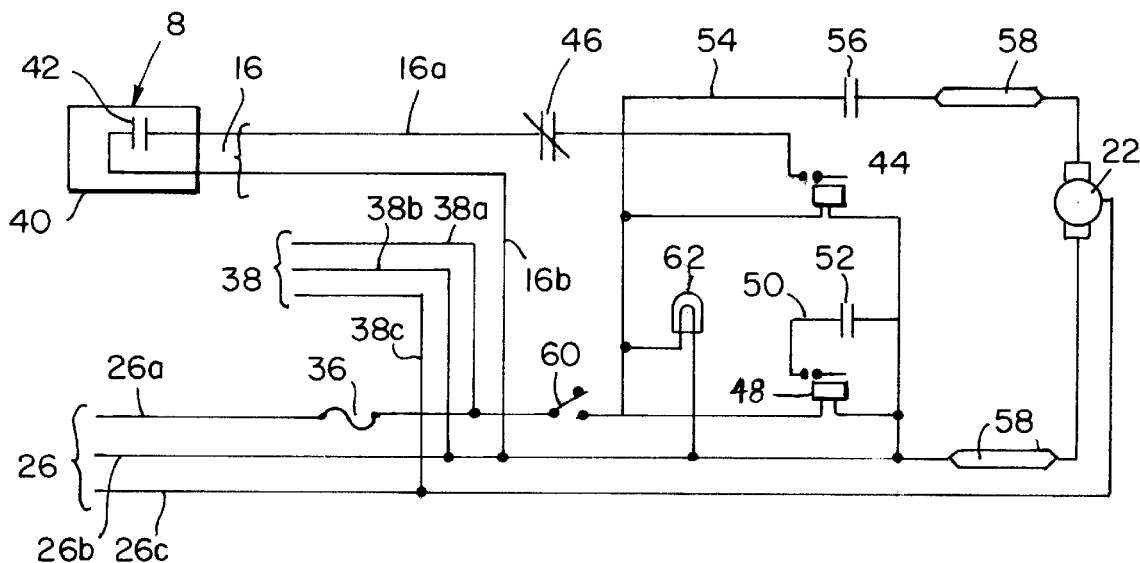
FIG. 2 is a schematic illustration of the electronic circuitry for controlling the apparatus.

Referring now to FIG. 2, there is shown the electronic circuitry for controlling the apparatus. The system is provided with power via power cord 26 which is a standard cord having a line 26a carrying 120 volts of AC current, a common line 26b, and a ground line 26c. A fuse 36 is provided in line 26a to protect the circuit against temporary power surges which could damage the circuitry.

Sensor 8 includes a stainless steel housing 40 containing a contact 42 therein. Power is provided to the sensor via cable 38 which plugs into the relay box 18. The cable 38 is a standard cord having a current carrying line 38a, a common line 38b, and a ground line 38c.

The sensor cable 16 is connected with the sensor 8 and includes a pair of wires 16a and 16b. Wire 16b is connected with common wire 26b, thereby to provide power to the sensor, and wire 16a is connected with a first relay 44. A contact 46, which is normally closed to allow a "high foam" signal to be transmitted from the sensor 8 to relay 44, is located in line 16a between the sensor and relay.

A second relay 48, which controls contact 46, is connected with the first relay via wire 50. A contact 52, which is controlled by relay 44 and serves to activate the second relay 48, is located in wire 50. A wire 54 containing a contact 56, which is also controlled by the first relay, is connected with the pump motor 58, thereby to activate the pump 22 when the high foam signal is transmitted by the sensor 8 to the first relay 44.

Thus, contacts 52 and 56 are both controlled by relay 44 and are normally open. Each is closed by relay 44 when the relay receives a high foam signal from sensor 8. Contact 46, on the other hand, is controlled by relay 48 and is normally closed. Contact 46 is opened by relay 48 after a high foam signal has been received by relay 44 and the pumping sequence has been completed. In this way, relay 48 and contact 46 prevent a high foam signal from being transmitted from the sensor to relay 44 and thereby prevent the pump from being activated for a preselected period of time following the injection of anti-foaming agent into the reactor.

A switch 60 is provided in line 26a to allow the power to the relays to be turned on and off. When the switch is closed, a light 62 turns on to indicate that power is being supplied to the relays.

OPERATION

When the sensing element 8 detects foam 10 at the height defined by the height of the sensor above the level of the wastewater 12, the foam causes contact 42 to close. When contact 42 closes, a signal is generated. The signal is transmitted to relay 44 via wire 16a, thereby activating the relay which, in turn, closes contacts 52 and 56.

Closing contact 56 activates pump 22 and anti-foaming agent 4 is pumped from tank 28 to reactor 6 for a preselected period of time determined by relay 44.

Closing contact 52 activates relay 48 which, in turn, opens contact 46. Opening contact 46 prevents signals from being transmitted from the sensor 8 to relay 44 and, consequently, prevents the pump from being activated. Only after relay 44 times out, which causes contact 52 to once again open, which thereby terminates the signal to relay 48, and relay 48 times out, thereby closing contact 46, can the pump be reactivated. Thus, even if sensor contact 42 is closed (i.e. indicating a high foam condition), no signal can be transmitted to relay 44 until relay 48 has timed out and contact 46 has once again closed. If, however, relay 48 times out, causing contact 46 to close, and sensor contact 42 is indicating a high foam situation, a signal will be immediately sent to relay 44, thereby causing anti-foaming agent to once again be pumped into the reactor. This sequence will be repeated as long as a high foam condition exists.

Thus, after relay 44 times out and the pump 22 is turned off, relay 48 is invoked and relay 48 defines a period of time during which the pump cannot be turned on even if the sensing element is detecting a high foam condition. If relay 48 times out and the sensor is still detecting a high foam condition, the pump 22 is again turned on and additional anti-foam is pumped to the reactor. If relay 48 times out and the sensor 8 is not detecting a high foam condition, the system remains idle until a high foam signal is received from the sensing element.

Relay 44 is typically set at a time interval of ten seconds. Thus, anti-foaming agent 4 is pumped from tank 28 to reactor 6 for ten seconds. Relay 48 is typically set at a time interval of several minutes to allow the anti-foaming agent to take affect. Of course, these time intervals can be adjusted to suit the particular parameters of the treatment system.

While in accordance with the provisions of the Patent Statutes the preferred forms and embodiments of the invention have been illustrated and described, it will be apparent to those of ordinary skill in the art that various changes and modifications may be made without deviating from the inventive concept set forth above.

What is claimed is:

1. Apparatus for controlling the amount of foam in a vessel, comprising (a) sensor means for detecting the presence of foam in the vessel and for producing an output signal when the amount of foam in the vessel reaches a predetermined level;

(b) means connected with said sensor means for intermittently injecting an anti-foaming agent into the vessel for a predetermined period of time when the amount of foam in the vessel reaches said predetermined level; and (c) a control circuit connected with said injection means for controlling the frequency and duration of said predetermined period of time, said control circuit including two timing relays, a first relay controlling said length of time said injection means injects the anti-foaming agent, and a second relay which prevents the anti-foaming agent from being injected for a preselected period of time following the injection of the anti-foaming agent and provides a lag time required for the anti-foaming agent to begin breaking down the foam.

2. Apparatus as defined in claim 1, wherein said control circuit further includes first and second contacts connected with, and controlled by, said first relay and a third contact connected with, and controlled by, said second relay.

3. Apparatus as defined in claim 2, wherein said first contact is connected with said injection means, whereby when said first contact is closed, said injection means is activated.

4. Apparatus as defined in claim 2, wherein said second contact is connected with said second relay, whereby when said second contact is closed, said second relay is activated.

5. Apparatus as defined in claim 2, wherein said third contact is connected with said sensor means and said first relay, whereby when said third contact is closed, said output signal may be transmitted from said sensor means to said first relay.

* * * * *